March 22, 1955  J. E. JONES  2,704,717
PHOTOGRAPHIC SUPERSENSITIZING COMBINATIONS
COMPRISING CARBOCYANINE DYES
Filed July 20, 1954

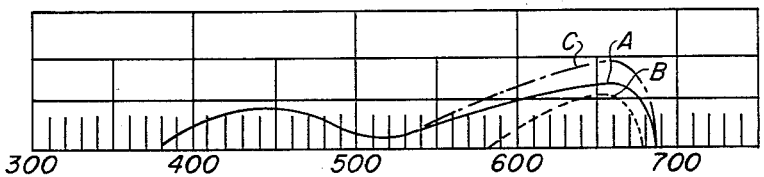

Fig. /

A = 3,3'-DIETHYL-5,6,5',6'-DIBENZOTHIACARBOCYANINE p-TOLUENESULFONATE
B = 5-[(I-ETHYL-2(IH)-β-NAPHTHOTHIAZOLYLIDENE)(I-METHYL-2(IH)-β-
  NAPHTHOTHIAZOLYLIDENE) ISOPROPYLIDENE]-I,3-DI(β-METHOXYETHYL)
  BARBITURIC ACID
C = 3,3'-DIETHYL-5,6,5',6'-DIBENZOTHIACARBOCYANINE p-TOLUENESULFONATE
  PLUS 5-[(I-ETHYL-2(IH)-β-NAPHTHOTHIAZOLYLIDENE)(I-METHYL-2(IH)-β-
  NAPHTHOTHIAZOLYLIDENE) ISOPROPYLIDENE]-I,3-DI(β-METHOXYETHYL)
  BARBITURIC ACID

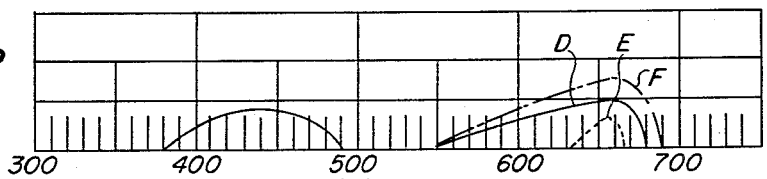

Fig. 2

D = 9-ETHYL-3,3'-DIMETHYL-5,6,5',6'-DIBENZOTHIACARBOCYANINE p-TOLUENE-
  SULFONATE
E = 4-[DI(I-ETHYL-2(IH)-β-NAPHTHOTHIAZOLYLIDENE) ISOPROPYLIDENE]-3-
  PHENYL-5(4H)-ISOXAZOLONE
F = 9-ETHYL-3,3'-DIMETHYL-5,6,5',6'-DIBENZOTHIACARBOCYANINE p-TOLUENE-
  SULFONATE PLUS 4-[DI(I-ETHYL-2(IH)-β-NAPHTHOTHIAZOLYLIDENE)
  ISOPROPYLIDENE]-5(4H)-ISOXAZOLONE

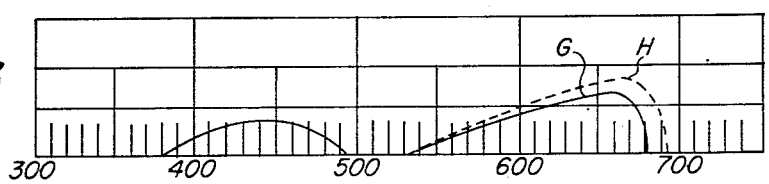

Fig. 3

G = 3,3',9-TRIETHYL-5,6,5',6'-DIBENZOTHIACARBOCYANINE p-TOLUENESULFONATE
H = 3,3',9-TRIETHYL-5,6,5',6'-DIBENZOTHIACARBOCYANINE p-TOLUENESULFONATE
  PLUS 5-[(I-ETHYL-2(IH)-β-NAPHTHOTHIAZOLYLIDENE)(I-METHYL-2(IH)-β-
  NAPHTHOTHIAZOLYLIDENE) ISOPROPYLIDENE]-I,3-DI(β-METHOXYETHYL)
  BARBITURIC ACID

JEAN E. JONES
INVENTOR.

BY *Daniel S. Mayne*
*Lawrence H. Willis*

ATTORNEYS

United States Patent Office 2,704,717
Patented Mar. 22, 1955

2,704,717
PHOTOGRAPHIC SUPERSENSITIZING COMBINATIONS COMPRISING CARBOCYANINE DYES

Jean E. Jones, Kodak Park, N. Y., assignor to Eastman Kodak Company, Rochester, N. Y., a corporation of New Jersey Application July 20, 1954, Serial No. 444,544
11 Claims. (Cl. 95—7)

This invention relates to photographic emulsions containing cyanine (e. g. carbocyanine) dyes, and in supersensitizing combination, certain un-ionized dyes.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e. increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found an improved means of altering the sensitivity in emulsions containing cyanine dyes. Since the conditions in the emulsion, i. e. the hydrogen ion and/or the silver ion concentration undergo little or no change in my method, I shall designate my method as a kind of supersensitization.

It is, therefore, an object of my invention to provide photographic emulsions containing cyanine dyes, and in supersensitizing combination therewith, certain un-ionized dyes. Another object is to provide a process for preparing these supersensitized emulsions. Other objects will become apparent from a consideration of the following description and examples.

The cyanine dyes useful in practicing my invention can advantageously be represented by the following general formula:

I

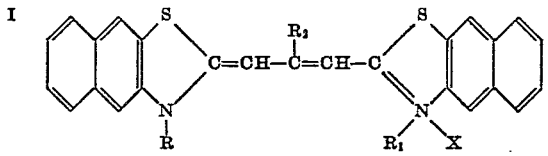

wherein R and $R_1$ each represents an alkyl group, such as methy, ethyl, n-propyl, carbethoxymethyl, etc., $R_2$ represents a hydrogen atom or an alkyl group, such as methyl, ethyl, etc. and X represents an acid radical, such as chloride, iodide, bromide, benzenesulfonate, p-toluenesulfonate, perchlorate, methylsulfate, ethylsulfate, etc.

The un-ionized dyes useful in practicing my invention can advantageously be represented by the following general formula:

II $$R_3-N\cdots C=CH-C=CH-C=\!=\!\!\!N-R_4$$

wherein $R_3$ and $R_4$ each represents an alkyl group, i. e. an alcohol radical, e. g. methyl, ethyl, n-propyl, n-butyl, β-hydroxyethyl, carbethoxymethyl, benzyl (phenylmethyl), etc., Q represents the non-metallic atoms necessary to complete an indandione nucleus or a heterocyclic nucleus containing from 5 to 6 atoms in the heterocyclic ring, such as those of the pyrazolone series (e. g. 3-methyl-1-phenyl-5-pyrazolone, 1-phenyl-5-pyrazolone, 1-(2-benzothiazolyl)-3-methyl-5-pyrazolone, etc.), those of the isoxazolone series (e. g. 3-phenyl-5-(4H)-isoxazolone, 3-methyl-5-(4H)-isoxazolone, etc.), those of the indandione series (e. g. 1,3-diketohydrindene, etc.), those of the oxindole series, (e. g. 1-alkyl-2,3-dihydro-2-oxindoles, etc.), those of the 2,4,6-triketohexahydropyrimidine series (e. g. barbituric acid or 2-thiobarbituric acid, as well as their 1-alkyl (e. g. 1-methyl, 1-ethyl, 1-n-heptyl, etc.), or 1,3-dialkyl (e. g. 1,3-dimethyl, 1,3-diethyl, 1,3-di-n-propyl, 1,3-diisopropyl, 1,3-dicyclohexyl, 1,3-di(β-methoxyethyl), etc.), or 1,3-diaryl (e. g. 1,3-diphenyl, 1,3-di(p-chlorophenyl), 1,3-di(p-ethoxycarbonylphenyl), etc.), or 1-aryl (e. g. 1-phenyl, 1-p-chlorophenyl, 1-p-ethoxycarbonylphenyl, etc.) or 1-alkyl-3-aryl (e. g. 1-ethyl-3-phenyl, 1-n-heptyl-3-phenyl, etc.) derivatives), those of the rhodanine series (i. e. 2-thio-2,4-thiazolidinedione series) such as rhodanine, 3-alkylrhodanines (e. g. 3-ethylrhodanine, 3-allylrhodanine, etc.) or 3-arylrhodanines (e. g. 3-phenylrhodanine, etc.), etc., those of the imidazo[1,2-α]pyridin-2(3H)-one series, those of the 5,7-dioxo-6,7-dihydro-5-thiazolo[3,2-α]pyrimidine series (e. g. 5,7-dioxo-3-phenyl-6,7-dihydro-5-thiazole-[3,2-α]pyrimidine, etc.), those of the 2-thio-2,4-oxazolidinedione series (i. e. those of the 2-thio-2,4(3H, 5H)-oxazoledione series) e. g. 3-ethyl-2-thio-2,4-oxazolidinedione, etc.), those of the thianaphthenone series (e. g. 2(3H)-thianaphthenone, etc.), those of the 2-thio-2,5-thiazolidinedione series (i. e. the 2-thio-2,5(3H, 4H)-thiazoledione series) (e. g. 3-ethyl-2-thio-2,5-thiazolidinedione, etc.), Z represents the non-metallic atoms necessary to complete a heterocyclic nucleus containing from 5 to 6 atoms in the heterocyclic ring, e. g. a heterocyclic nucleus of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethoxybenzothiazole, 5-hydroxybenzothiazole, 6-hydroxybenzothiazole, 7-hydroxybenzothiazole, etc.), a heterocyclic nucleus of the naphthothiazole series (e. g. α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), a heterocyclic nucleus of the benzoselenazole series (e. g. benzoselenazole, 5-chlorobenzoselenazole, 6-methoxybenzoselenazole, 5-methoxybenzoselenazole, etc.), a heterocyclic nucleus of the naphthoselenazole series (e. g. α-naphthoselenazole, β-naphthoselenazole, etc.), a heterocyclic nucleus of the naphthoxazole series (e. g. α-naphthoxazole, β-naphthoxazole, etc.), etc. and $Z_1$ represents the non-metallic atoms necessary to complete a heterocyclic nucleus of the naphthothiazole series (such as those listed above for Z) or the naphthoselenazole series (such as those listed above for Z).

Dyes of Formula II above which have been found to be particularly useful in practicing my invention include dyes selected from those represented by the following general formula:

III
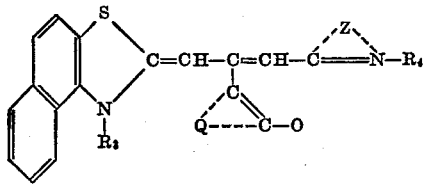

wherein $R_3$, $R_4$, Z and Q each have the values given above. Particularly useful are those dyes wherein Q represents the non-metallic atoms necessary to complete a heterocyclic nucleus of the barbituric acid series and Z represents the non-metallic atoms necessary to complete a heterocyclic nucleus of the naphthothiazole series or the naphthoselenazole series.

Many of the dyes represented by Formula I above have been previously described in the prior art. See, for example, British patent specification 467,252, application dated September 9, 1935.

The dyes of Formula II (or III) are described in the copending applications Serial No. 282,696, filed April 16, 1952, now abandoned, and Serial No. 375,279, filed August 19, 1953 of F. L. White and Leslie G. S. Brooker.

According to my invention, I incorporate one or more of the cyanine dyes selected from those represented by Formula I above with one or more of the dyes selected from those represented by Formulas II or III above in a photographic emulsion. My invention is particularly directed to the ordinarily employed gelatino-silver-halide emulsions. However, my supersensitizing combinations can be employed in silver halide emulsions in which the carrier is other than gelatin, e. g., a resinous substance or cellulosic material which has no deteriorating effect on the light-sensitive materials.

The sensitizing dyes can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the individual sensitizing dyes are advantageously employed in a concentration somewhat less than their optimum concentration (i. e. the concentration at which the individual dyes give greatest sensitivity). If each of the dyes in the supersensitizing combination is employed in its optimum concentration, it is possible, in certain cases that the sensitization produced by the supersensitizing combination will have passed through a maximum.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of my supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations. The concentrations of the individual dyes can then be increased until the optimum concentration of the supersensitizing combination is determined.

Ordinarily the optimum or near optimum concentration of the cyanine (i. e. carbocyanine) dyes selected from those represented by Formula I above, which I employ in practicing my invention, is of the order of from 0.05 to 0.3 g. per mol. of silver halide in the emulsion.

The un-ionized dyes selected from those represented by Formula II (or III) above are advantageously employed in concentrations on the order of from .01 to 0.3 g. per mol. of silver halide in the emulsion.

Generally speaking, the ratio of concentration of the dye of Formula II or III to the cyanine dye of Formula I can vary rather widely in my combinations, e. g. from 1:20 to 3:1 by weight in many cases.

The methods of incorporating sensitizing dyes in emulsions are well known to those skilled in the art. In practicing my invention, the sensitizing dyes can be incorporated in the emulsions separately or together. It is convenient to add the dyes separately in the form of solutions in appropriate solvents. Methanol, ethanol, pyridine, etc. (and especially pyridine) have proven satisfactory as solvents for the dyes of Formulas I, II, III which I employ. Acetone has also been found to be a suitable solvent in certain cases. In general, it is advantageous to employ pyridine, diluted with methanol or acetone, as the solvent for the supersensitizing combinations of my invention. For example, the dye can be dissolved in pyridine and the solution then diluted with methanol or acetone. The dyes are advantageously incorporated in the finished, washed emulsions and should be uniformly distributed throughout the emulsions. The following procedure is satisfactory: Stock solutions of the sensitizing dyes desired are prepared by dissolving the dyes in appropriate solvents as described above. Then, to the flowable gelatino-silver-halide emulsion, the desired amounts of the stock solution of one of the dyes are slowly added, while stirring the emulsion. Stirring is continued until the dye is thoroughly incorporated in the emulsion. Then the desired amount of the stock solution of the second dye is slowly added to the emulsion, while stirring. Stirring is continued until the second dye is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the individual sensitizing dyes actually incorporated in the emulsion will vary somewhat from dye to dye, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly my invention is directed to any emulsion containing a combination of the aforesaid sensitizing dyes whereby a supersensitizing effect is obtained.

The following examples will serve to illustrate further the manner of practicing my invention. To different portions of the same batch of photographic gelatino-silver-bromiodide emulsion were added (1) a cyanine dye selected from those of Formula I and (2) a combination of the cyanine dye of Formula I and an un-ionized dye selected from those represented by Formula II (or III) above. In some instances, a third coating was prepared using the same emulsion formula and a single dye, one of the un-ionized dyes selected from those of Formula II (or III). In some instances, the table will show that this third coating gave only a low speed or one too low to measure in the region transmitted by the filter (designated asterisk in the table). Different emulsions were used in some of the examples, although the emulsions of each individual example were obtained from the same batch. However, the coatings of Examples 1–4 were obtained from the same batch and the coatings of Examples 5, 6 and 7 were obtained from the same batch. Before coating, the emulsions were digested for a short time in a tank maintained at 52° C. The different portions of emulsions were then coated on supports and exposed in the usual manner in a spectrograph and a sensitometer (Type Ib) through a Wratten No. 25 filter, i. e. a filter which transmits substantially no light of wavelength shorter than 580 mu. The red speed, gamma and fog for each of the coatings was then determined. The results are recorded in the following table. The transmittance of a Wratten No. 25 filter is as follows:

| | Per cent |
|---|---|
| 580 mu | Nil |
| 590 mu | 12.6 |
| 600 mu | 50.0 |
| 610 mu | 75.0 |
| 620 mu | 82.6 |
| 630 mu | 85.5 |
| 640 mu | 86.7 |
| 650 mu | 87.6 |
| 660 mu | 88.2 |
| 670 mu | 88.5 |
| 680 mu | 89.0 |
| 690 mu | 89.3 |
| 700 mu | 89.5 |

Luminous Transmittance 14.0, dominant wavelength 615.1, and excitation purity 100.0.

| Ex. | Dye (g. per mole AgX) | Red Light Exposure | | |
|---|---|---|---|---|
| | | 30/E Speed | Gamma | FOG |
| 1 | (a) 3,3'-diethyl-5,6,5',6'-dibenzothiacarbocyanine p-toluenesulfonate (0.080) | 65.5 | 2.5 | .08 |
| | (b) 5-[(1-ethyl-2(1H)-β-naphthothiazolylidene) (1-methyl-2(1H)-β-naphthothiazolylidene) isopropylidene]-1,3-di(β-methoxyethyl)barbituric acid (0.080) | 13.7 | 3.2 | .06 |
| | (c) dye (a) (0.080) plus dye (b) (0.030) | 80.5 | 2.0 | .09 |
| 2 | (d) 3,3'-diethyl-9-methyl-5,6,5',6'-dibenzothiacarbocyanine p-toluenesulfonate (0.080) | 46.5 | 2.8 | .08 |
| | (e) dye (d) (0.080) plus dye (b) (0.030) | 73.5 | 2.2 | .09 |
| 3 | (f) 9-ethyl-3,3'-dimethyl-5,6,5',6'-dibenzothiacarbocyanine p-toluenesulfonate (0.080) | 33.0 | 2.5 | .09 |
| | (g) dye (f) (0.080) plus dye (b) (0.030) | 77.0 | 2.2 | .09 |
| 4 | (h) 3,3',9-triethyl-5,6,5',6'-dibenzothiacarbocyanine p-toluenesulfonate (0.080) | 57.0 | 2.7 | .08 |
| | (i) dye (h) (0.080) plus dye (b) (0.030) | 77.0 | 2.1 | .09 |
| | (j) dye (b) (0.080) | 23.5 | 2.98 | .07 |
| 5 | (k) 4-[di(1-ethyl-2(1H)-β-naphthothiazolylidene)isopropylidene]-3-phenyl-5(4H)-isoxazolone (0.080) | 5.1 | 1.56 | .05 |
| | (l) dye (f) (0.080) plus dye (k) (0.080) | 41.5 | 2.40 | .08 |
| 6 | (m) 5-[di(1-ethyl-2(1H)-β-naphthothiazolylidene)isopropylidene]-1,3-di(β-methoxyethyl)barbituric acid (0.080) | * | * | |
| | (n) dye (f) (0.080) plus dye (m) (0.080) | 35.5 | 2.60 | .08 |
| 7 | (o) 2-[di(1-ethyl-2(1H)-β-naphthothiazolylidene)isopropylidene]-1,3-indandione (0.080) | * | * | .04 |
| | (p) dye (f) (0.080) plus dye (o) (0.030) | 40.5 | 2.84 | .07 |

The accompanying drawing illustrates the supersensitizing effect obtained with three of my new combinations of dyes in gelatino-silver-bromiodide emulsions. Each figure of the drawing is a diagrammatic reproduction of three, or in the case of Figure 3, two, spectrographs. In each figure, the sensitivity of the emulsion containing the cyanine dye of Formula I is represented by the solid curve. In Figures 1 and 2, the sensitivity of the emulsions containing the un-ionized dye of Formula II (or III) is represented by the dotted lines or broken curve. In each figure, the sensitivity of the emulsion containing both the cyanine dye of Formula I and the un-ionized dye of Formula II (or III) is represented by the upper curve (alternate long and short dashes). The curve consisting of dotted lines has been omitted in Figure 3 since it would be identical to curve B in Figure 1.

In Figure 1, curve A represents the sensitivity of an ordinary gelatino-silver-bromiodide emulsion sensitized with 3,3' - diethyl - 5,6,5',6' - dibenzothiacarbocyanine p-toluenesulfonate, curve B represents the sensitivity of the same emulsion containing 5 - [(1 - ethyl - 2(1H) - β- naphthothiazolylidene)( 1 - methyl - 2(1H) - β - naphthothiazolylidene)isopropylidene] - 1,3 - di(β - methoxyethyl)barbituric acid, and curve C represents the sensitivity of the same emulsion containing both 3,3' - diethyl-5,6,5',6' - dibenzothiacarbocyanine p-toluenesulfonate and 5 - [(1 - ethyl - 2(1H) - β - naphthothiazolylidene)(1-methyl - 2(1H) - β - naphthothiazolylidene)isopropylidene] - 1,3 - di(β - methoxyethyl)barbituric acid. The sensitometric measurements for these emulsions are given in Example 1 of the above table.

In Figure 2, curve D represents the sensitivity of an ordinary gelatino-silverbromiodide emulsion sensitized with 9 - ethyl - 3,3' - dimethyl - 5,6,5',6' - dibenzothiacarbocyanine p-toluenesulfonate, curve E represents the sensitivity of the same emulsion containing 4 - [di(1-ethyl - 2(1H) - β - naphthothiazolylidene)isopropylidene] - 3 - phenyl - 5(4H) - isoxazolone, and curve F represents the sensitivity of the same emulsion containing both 9 - ethyl - 3,3' - dimethyl - 5,6,5',6' - dibenzothiacarbocyanine p-toluenesulfonate and 4 - [di(1 - ethyl-2(1H) - β - naphthothiazolylidene)isopropylidene] - 3-phenyl-5(4H)-isoxazolone. The sensitometric measurements for these emulsions are given in Example 5 above.

In Figure 3, curve G represents the sensitivity of an ordinary gelatino-silver-bromiodide emulsion containing 3,3',9 - triethyl - 5,6,5',6' - dibenzothiacorbocyanine p-toluenesulfonate and curve H represents the sensitivity of the same emulsion containing both 3,3',9 - triethyl - 5,6,5',6'-dibenzothiacarbocyanine p-toluenesulfonate and 5 - [(1-ethyl - 2(1H) - β - naphthothiazolylidene)(1 - methyl-2(1H) - β - naphthothiazolylidene)isopropylidene] - 1,3-di(β - methoxyethyl)barbituric acid. The sensitometric measurements for these emulsions are given in Example 4 of the above table.

My invention is primarily directed to the ordinarily employed gelatino-silver-halide developing-out emulsions, e. g. gelatino-silver-chloride, -chlorobromide, -chloroiodide, -chlorobromiodide, -bromide and -bromiodide developing-out emulsions. While the results in the above tables were obtained using gelatino-silver-bromiodide emulsions, excellent results have also been obtained using gelatino-silver-chlorobromide emulsions. Emulsions which form the latent image mostly inside the silver halide grains, such as the emulsions set forth in U. S. Patent 2,456,956, dated December 21, 1948, can also be employed in practicing my invention.

The emulsions prepared in accordance with my invention can be coated in the usual manner on any suitable support, e. g. glass, cellulose nitrate film, cellulose acetate film, polyvinylacetal resin film, paper or metal.

Photographic silver halide emulsions, such as those listed above, containing the supersensitizing combinations of my invention can also contain such addenda as chemical sensitizers, e. g. sulfur sensitizers (e. g. allyl thiocarbamide, thiourea, allylisothiocyanate, cystine, etc.), various gold compounds (e. g. potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5 - nitroindazole, benzidine, mercaptans, etc. (see Mees—"The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. application 711,380, filed August 29, 1947, now Patent No. 2,640,776, etc.; or mixtures of such addenda. Dispersing agents for color couplers, such as those set forth in U. S. Patents 2,322,027 and 2,304,940, can also be employed in the above-described emulsions.

In the above table it will be noted that in certain examples the amounts of dyes used in the supersensitizing combinations do not correspond to the amounts used with each dye alone. Actually, supersensitization occurs according to my invention when the combination of dyes gives more speed than either dye alone at any concentration. Thus, in some instances, the amount of dye, when used alone, is not identical with that used in the supersensitizing combination. This is due to the fact that optimum conditions have been used, insofar as possible, in each of the coatings. Use of larger amounts of dyes in the supersensitizing combinations is not necessary, and in some instances, is actually detrimental.

What I claim as my invention and desire secured by Letters Patent of the United States is:

1. A photographic silver halide emulsion sensitized with a supersensitizing combination of at least one carbocyanine dye selected from those represented by the following general formula:

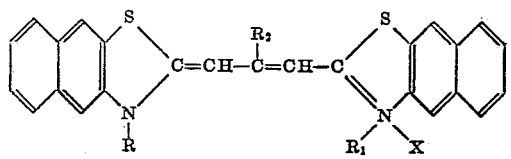

wherein R and $R_1$ each represents an alkyl group, $R_2$ represents a member selected from the group consisting of a hydrogen atom and an alkyl group, and X represents an acid radical, and at least one dye selected from those represented by the following general formula:

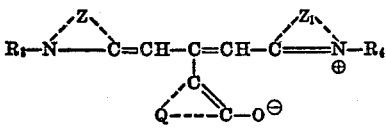

wherein $R_3$ and $R_4$ each represents an alkyl group, Z represents the non-metallic atoms necessary to complete a heterocyclic nucleus selected from the group consisting of those of the benzothiazole series, those of the naphthothiazole series, those of the benzoselenazole series, those of the naphthoselenazole series, and those of the naphthoxazole series, $Z_1$ represents the non-metallic atom necessary to complete a heterocyclic nucleus selected from the group consisting of those of the naphthothiazole series and those of the naphthoselenazole series, and Q represents the non-metallic atoms necessary to complete a nucleus selected from the group consisting of those of the indandione series, those of the barbituric acid series, those of the 2-thiobarbituric acid series, and those of the isoxazolone series.

2. A photographic gelatino-silver-halide emulsion sensitized with a supersensitizing combination of at least one carbocyanine dye selected from those represented by the following general formula:

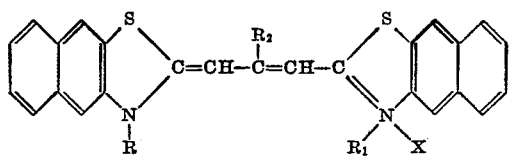

wherein R and $R_1$ each represents an alkyl group of the formula $C_nH_{2n+1}$ wherein $n$ is a positive integer of from 1 to 2, $R_2$ represents a member selected from the group consisting of a hydrogen atom, a methyl group, and an ethyl group, and X represents an acid radical, and at least one dye selected from those represented by the following general formula:

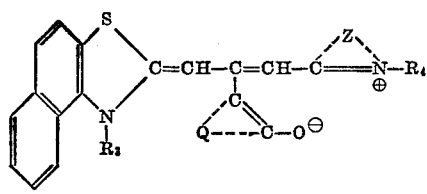

wherein $R_3$ and $R_4$ each represents a member selected from the group consisting of a methyl group and an ethyl group, Z represents the non-metallic atoms necessary to complete a heterocyclic nucleus selected from the group consisting of those of the naphthothiazole series and those of the naphthoselenazole series, and Q represents the non-metallic atoms necessary to complete a nucleus selected from the group consisting of those of the indandione series, those of the barbituric acid series, those of the 2-thiobarbituric acid series, and those of the isoxazolone series.

3. A photographic gelatino-silver-halide emulsion sensitized with a supersensitizing combination of at least one symmetrical carbocyanine dye selected from those represented by the following general formula:

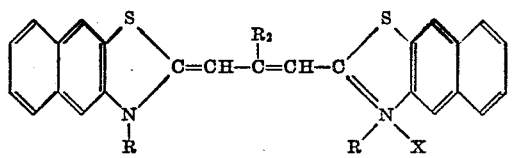

wherein R represents a member selected from the group consisting of a methyl group and an ethyl group, $R_2$ represents a member selected from the group consisting of a hydrogen atom, a methyl group, and an ethyl group, and X represents an acid radical, and at least one dye selected from those represented by the following general formula:

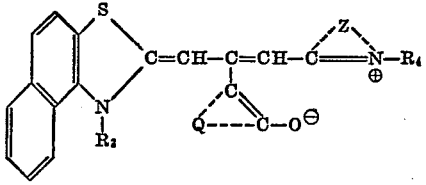

wherein $R_3$ and $R_4$ each represents a member selected from the group consisting of a methyl group and an ethyl group, Z represents the non-metallic atoms necessary to complete a heterocyclic nucleus selected from those of the naphthothiazole series and Q represents the non-metallic atoms necessary to complete a nucleus of the barbituric acid series.

4. A photographic gelatino-silver-halide emulsion sensitized with a supersensitizing combination comprising 3,3'-diethyl-5,6,5',6'-dibenzothiacarbocyanine p-toluenesulfonate and 5-[(1-ethyl-2(1H)-β-naphthothiazoylidene) (1-methyl - 2(1H) - β - naphthothiazolylidene) isopropylidene]-1,3-di(β-methoxyethyl) barbituric acid.

5. A photographic gelatino-silver-halide emulsion sensitized with a supersensitizing combination comprising 9-ethyl-3,3'-dimethyl-5,6,5',6'-dibenzothiacarbocyanine p-toluenesulfonate and 5-[(1-ethyl-2(1H)-β-naphthothiazolylidene) (methyl-2(1H)-β-naphthothiazolylidene) isopropylidene]-1,3-di(β-methoxyethyl) barbituric acid.

6. A photographic gelatino-silver-halide emulsion sensitized with a supersensitizing combination of 3,3',9-triethyl-5,6,5',6'-dibenzothiacarbocyanine p-toluenesulfonate and 5-[(1-ethyl-2(1H)-β-naphthothiazolylidene) (1-methyl-2(1H)-β-naphthothiazolylidene) isopropylidene]-1,3-di(β-methoxyethyl) barbituric acid.

7. A photographic gelatino-silver-halide emulsion sensitized with a supersensitizing combination of at least one symmetrical carbocyanine dye selected from those represented by the following general formula:

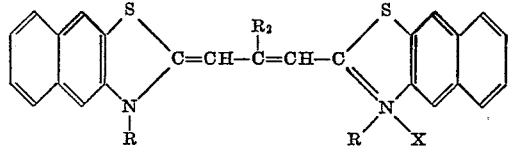

wherein R represents a member selected from the group consisting of a methyl group and an ethyl group, $R_2$ represents a member selected from the group consisting of a hydrogen atom, a methyl group, and an ethyl group, and X represents an acid radical, and at least one dye selected from those represented by the following general formula:

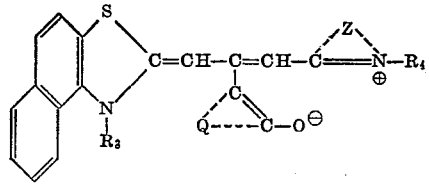

wherein $R_3$ and $R_4$ each represents a member selected from the group consisting of a methyl group and an ethyl group, Z represents the non-metallic atoms necessary to complete a heterocyclic nucleus selected from those of the naphthothiazole series and Q represents the non-metallic atoms necessary to complete a nucleus of the isoxazolone series.

8. A photographic gelatino-silver-halide emulsion sensitized with a supersensitizing combination comprising 9-ethyl-3,3'-dimethyl-5,6,5',6'-dibenzothiacarbocyanine p-toluenesulfonate and 4-[di(1-ethyl-2(1H)-β-napththothiazolylidene)isopropylidene]-3-phenyl-5(4H)-isoxazolone.

9. A photographic gelatino-silver-halide emulsion sensitized with a supersensitizing combination of at least one symmetrical carbocyanine dye selected from those represented by the following general formula:

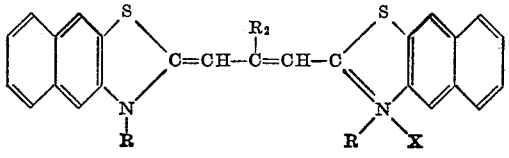

wherein R represents a member selected from the group consisting of a methyl group and an ethyl group, $R_2$ represents a member selected from the group consisting of a hydrogen atom, a methyl group, and an ethyl group, and X represents an acid radical, and at least one dye selected from those represented by the following general formula:

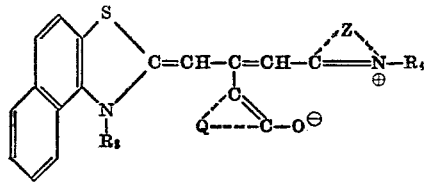

wherein $R_3$ and $R_4$ each represents a member selected from the group consisting of a methyl group and an ethyl group, Z represents the non-metallic atoms necessary to complete a heterocyclic nucleus selected from those of the naphthothiazole series and Q represents the non-metallic atoms necessary to complete a nucleus of the indandione series.

10. A photographic gelatino-silver-halide emulsion sensitized with a supersensitizing combination comprising 9-ethyl-3,3'-dimethyl-5,6,5',6'-dibenzothiacarbocyanine p-toluenesulfonate and 2-[di(1-ethyl-2(1H)-β-naphthothiazolylidene)isopropylidene]-1,3-indandione.

11. A photographic gelatino-silver-bromiodide developing-out emulsion sensitized with a supersensitizing combination of at least one symmetrical carbocyanine dye selected from those represented by the following general formula:

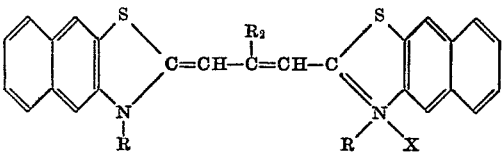

wherein R represents a member selected from the group consisting of a methyl group and an ethyl group, $R_2$ represents a member selected from the group consisting of a hydrogen atom, a methyl group, and an ethyl group, and X represents an acid radical, and at least one dye selected from those represented by the following general formula:

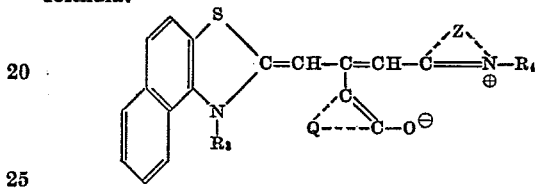

wherein $R_3$ and $R_4$ each represents a member selected from the group consisting of a methyl group and an ethyl group, Z represents the non-metallic atoms necessary to complete a heterocyclic nucleus selected from those of the naphthothiazole series and Q represents the non-metallic atoms necessary to complete a nucleus of the barbituric acid series.

No references cited.